United States Patent Office 3,334,272
Patented Aug. 1, 1967

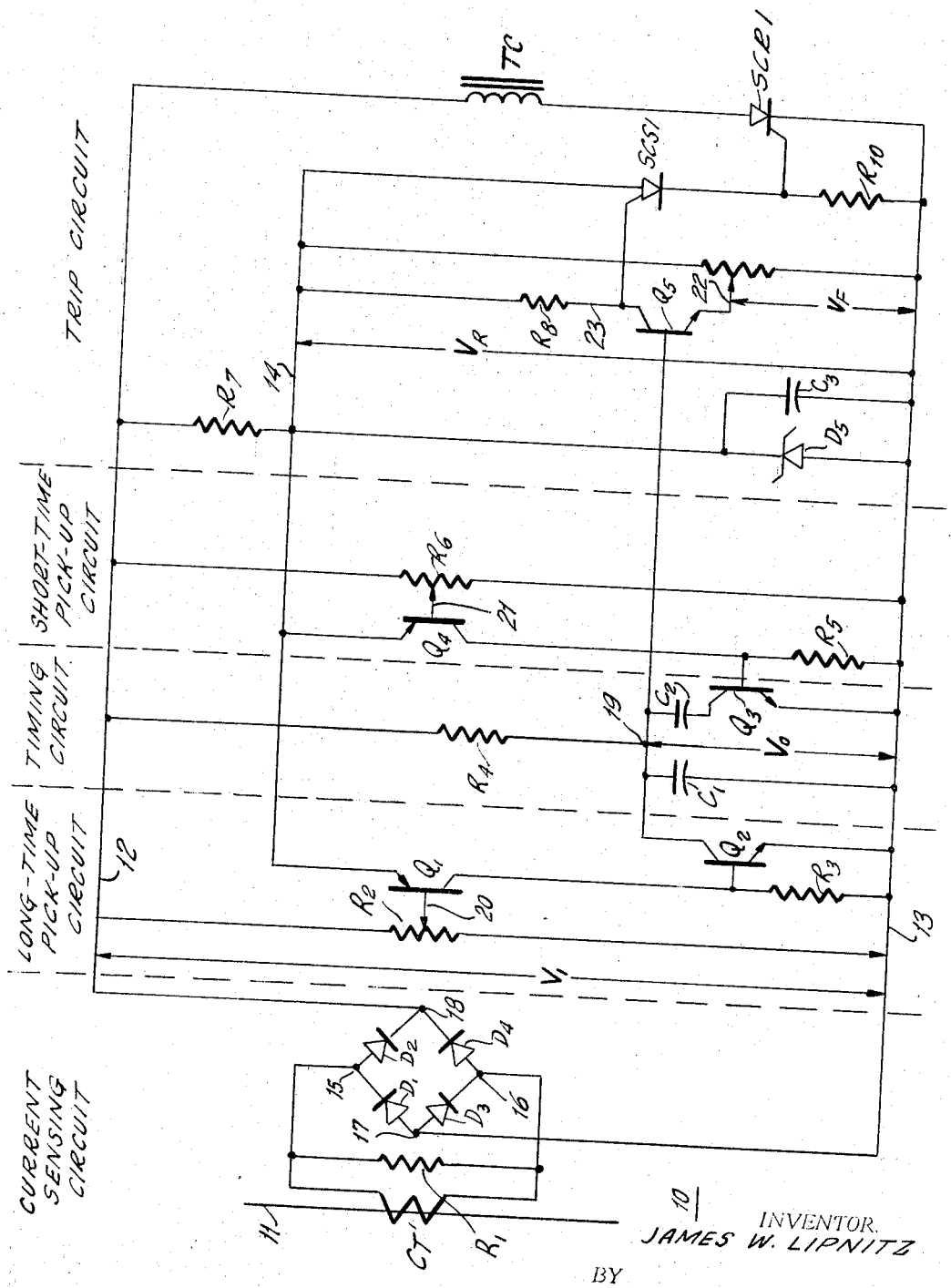

3,334,272
STATIC OVERCURRENT RELAY
James W. Lipnitz, Cherry Hill, N.J., assignor to I-T-E Circuit Breaker Company, Philadelphia, Pa., a corporation of Pennsylvania
Filed Sept. 3, 1965, Ser. No. 484,928
12 Claims. (Cl. 317—36)

The instant invention relates to current sensing devices, and more particularly to a novel static overcurrent relay which provides an inverse time relationship for tripping a circuit interrupter dependent upon the current flow through the circuit being protected in which the inverse time characteristics can be automatically and electronically altered in response to certain predetermined conditions.

In the circuit interrupter field, it is quite typical to provide inverse time element devices which cause a circuit interrupter to trip after a predetermined time interval so long as a certain current magnitude persists in the circuit being protected. As this current magnitude increases, the time shortens, hence the inverse time relationship. Conventionally, such inverse time overcurrent relays comprise electromechanical devices for developing the current time relationship. With the advent of solid state circuits, it is found that overcurrent relays may utilize such devices, thereby yielding a static overcurrent relay which has no moving parts, is capable of providing an extremely long, useful operating life, and is extremely reliable. Static overcurrent relays of this general type are disclosed in detail in copending applications Ser. No. 248,463, now Patent No. 3,300,685, entitled Static Overcurrent Relay, filed Jan. 4, 1963, in the name of S. E. Zocholl and Ser. No. 403,208, entitled, Static Overcurrent Relay, filed Oct. 12, 1964, in the name of S. E. Zocholl et al., and both being assigned to the assignee of the instant invention.

Basically, such static overcurrent relays are comprised of means for monitoring the current in the circuit being protected and for developing a voltage directly proportional to the circuit current, which voltage is impressed upon a timing circuit which is designed to develop an output voltage level substantially equal to the input voltage level after a predetermined time delay, thereby providing an inverse time relationship. Since a normal current flow will also cause the timing circuit to be operative, a pick-up circuit is provided to protect operation of the timing circuit until a predetermined voltage magnitude is achieved, at which time the timing circuit is automatically enabled to operate and yield the desired inverse time relationship. When the output of the timing circuit reaches a predetermined critical voltage level, it is employed to control an electronic switch means for energizing relay means to automatically trip a circuit interrupter.

In many applications it is highly desirable to provide means for significantly altering the inverse time-current relationship to protect the circuit being monitored against differing forms of overload current conditions. For example, when large motors and other similar devices comprise a load for the power circuit being monitored, the currents which are encountered in such a circuit are of such a nature as to require a discontinuous or foreshortened time delay versus current above a predetermined magnitude.

The instant invention is characterized by providing an electronic pick-up circuit which is capable of instantaneously and automatically disabling one or more elements of a multi element timing circuit to alter its time-current characteristics under control of predetermined conditions.

The instant invention is comprised of a current sensing means which is provided to develop a substantially D-C voltage which is representative of and proportional to the current in the circuit being monitored. This D-C voltage is applied to a timing circuit comprised of resistor-capacitor elements, the output of the timing circuit building up to a predetermined level related to the input voltage thereto, which buildup takes place over a predetermined time interval. Since there will always be a D-C voltage developed by the full wave rectifier circuit, the pick-up circuit is provided to disable the timing circuit from operation until a minimum input voltage level is achieved, at which time the timing circuit is automatically enabled.

When the output voltage level of the timing circuit achieves a critical value, this voltage is used to trigger switch means for energizing coil means to trip a circuit interrupter device.

The time constant for the timing circuit is directly proportional to the value of the resistors times the value of the capacitors in the timing circuit which may, for example, be connected in series fashion. For any given voltage impressed across a resistor and capacitor in series, the time for the voltage on the capacitor to reach a predetermined level will depend upon the value of the resistor and capacitor elements. If the value of the resistor is held constant, changing the effective capacity will result in a change in the time to reach a predetermined level. Additionally, since the higher impressed voltage will also result in a shorter time to reach a level, impressed voltage which is proportional to primary current, i.e., the current in the circuit being monitored, will result in timing inversely proportional to current.

To achieve this objective, a second short-time pick-up circuit is provided and is designed to maintain one of the elements of the timing circuit in the operative state until a predetermined voltage level is achieved. At this time, the short-time pick-up circuit operates to disable or remove one or more of the timing circuit elements, thereby altering the time constant for the timing circuit. This short-time constant enables the circuit interrupter to be tripped after a shorter predetermined time interval due to the current condition existing in the circuit being monitored. While the pick-up circuit has been described here as being capable of shortening the timing circuit time constant, it is also possible for other applications to operate the short-time pick-up circuit in such a manner as to lengthen the timing circuit time constant if so desired.

It is, therefore, one object of the instant invention to provide a novel static overcurrent relay circuit for use in power transmission circuits and the like.

Another object of the instant invention is to provide novel static overcurrent relay means for use in monitoring power transmission circuits and the like and comprising electronic means for automatically altering the time-current characteristic curves developed by the relay means when a certain predetermined current magnitude is achieved.

Still another object of the instant invention is to provide novel static overcurrent relay means for use in monitoring power transmission circuits and the like comprising a timing circuit of passive electric circuit components and a short-time pick-up circuit for effecting certain of the passive elements in the timing circuit to alter the time-current characteristic curve for the relay means.

These and other objects of the instant invention will become apparent when reading the accompanying description and drawings, in which the sole figure is a schematic diagram showing a static overcurrent relay means designed in accordance with the principles of the instant invention.

The sole figure shows a static overcurrent relay means 10 for use in monitoring the current flowing in a circuit 11 which may, for example, be a power distribution circuit. A current transformer means $CT_1$ is inductively coupled to the transmission circuit 11 for developing a voltage across burden resistor $R_1$ coupled across the terminals of the current transformer. A full-wave rectification bridge comprised of diodes $D_1$ and $D_4$ is coupled in a typical manner with terminals 15 and 16 connected across resistor $R_1$ and with terminals 17 and 18 coupled to common buses 13 and 12, respectively, thereby developing a full wave rectified voltage $V_1$ which is applied to buses 12 and 13. While the circuit diagram of the figure is shown to monitor a single circuit 11, it should be clearly understood that additional circuits may be monitored such as, for example, the three circuits of a three-phase system, or the plural circuits of any polyphase system. The configuration of protecting such three-phase systems is set forth in detail in the previously mentioned copending applications. No further description will be given herein, since this modification lends no novelty to the instant invention.

The full-wave rectifier voltage $V_1$ is impressed across the timing circuit which is comprised of resistor $R_4$ and capacitors $C_1$ and $C_2$. The output of the timing circuit is taken at 19 which develops a voltage $V_0$ with the build-up of voltage $V_0$ following the time-current characteristic curve for the timing circuit.

It should be understood that for any voltage $V_1$ applied to the timing circuit, the output voltage $V_0$ will begin to rise. To prevent this condition, the long-time pick-up circuit is employed to maintain the voltage $V_0$ at zero (i.e., to maintain the capacitors $C_1$ and $C_2$ discharged) until the voltage $V_1$ reaches a predetermined pick-up level.

The long-time pick-up circuit functions in the following manner.

The full-wave rectified voltage $V_1$ appearing across buses 12 and 13 flows through the branch circuit comprised of resistor $R_7$ and zener diode $D_5$ resulting in a constant voltage drop which establishes a fixed voltage $V_R$ at bus 14. The capacitor $C_3$ connected across the terminals of zener diode $V_5$ acts to filter the voltage appearing at bus 14 to more closely achieve these levels (i.e., to substantially reduce the percentage ripple in the D.C. signal appearing at bus 14). The voltage $V_R$ is directly applied in the emitter of transistor $Q_1$ which forms one component of the long-time pick-up circuit. A portion of the voltage $V_1$ is applied to the base of transistor $Q_1$ through the potentiometer $R_2$ whose wiper arm 20 is coupled to the base electrode. When the portion of the voltage $V_1$ applied to the base of transistor $Q_1$ is less than the voltage $V_R$, a current flow is established from reference bus 14 and emitter electrode of transistor $Q_1$ to its base electrode. This causes current to flow out through the collector terminal of transistor $Q_1$, developing a voltage drop across resistor $R_3$. The collector current of transistor $Q_1$ thus supplies base current to transistor $Q_2$ causing it to become conductive so as to provide a substantially short circuited discharge path for capacitor $C_1$ and $C_2$, thereby maintaining voltage $V_0$ at virtually zero volts.

When the voltage at the potentiometer wiper arm 20 exceeds the reference voltage $V_R$, this drives transistor $Q_1$ into cut-off state, thus terminating any collector current of transistor $Q_1$. This, in turn, removes the base drive from the base of transistor $Q_2$, driving transistor $Q_2$ into cut-off state, hence removing the virtually short circuited discharge path from the timing circuit capacitors, thereby enabling them to accumulate a charge across their terminals. The rate of charge accumulation is dependent upon the values of the timing circuit elements $R_4$, $C_1$ and $C_2$.

The operation of the short-time pick-up circuit is as follows:

The full-wave rectified voltage $V_1$ applied to buses 12 and 13 is further applied to potentiometer $R_6$ of the short-time pick-up circuit. Thus, a portion of this voltage $V_1$ is applied to the base electrode of transistor $Q_4$ whose emitter electrode is coupled to the reference voltage bus 14. Since the emitter of transistor $Q_4$ is also referenced to reference voltage $V_R$, it will continue to conduct in the same manner as transistor $Q_1$, as long as the voltage at the potentiometer arm 21 does not exceed the value $V_R$. Collector current is developed by transistor $Q_4$ developing a voltage across resistor $R_5$ in order to maintain transistor $Q_3$ in the conductive state, thus acting as a substantially short-circuited current path for capacitor $C_2$ from terminal 19 to bus 13 and enabling the capacitor $C_2$ to develop a charge across its plates.

As the current in the circuit 11 being monitored rises, this causes the voltage $V_1$ to increase, thereby increasing the portion of voltage applied to the base of transistor $Q_4$ through potentiometer $R_6$. When this value exceeds the reference voltage $V_R$, transistor $Q_4$ is driven into cut-off, thus terminating any collector current flow therefrom and reducing the voltage drop across resistor $R_5$ to zero. This drives transistor $Q_3$ into cut-off, creating a very high impedance path through transistor $Q_3$ and effectively open-circuiting one terminal of capacitor $C_2$ so as to remove it from the operative condition within the timing circuit. This leaves passive elements $R_4$ and $C_1$ remaining in the timing circuit causing the time to reach the firing voltage $V_F$ to be shortened from that time required to reach the firing voltage $V_F$ with the capacitor $C_2$ in the circuit.

The output voltage $V_0$ developed by the timing circuit is applied to the trip circuit at the base of transistor $Q_5$. The emitter of transistor $Q_5$ has a portion of the reference voltage $V_R$ applied to its emitter electrode through potentiometer $R_9$ whose potentiometer wiper arm 22 is coupled to the emitter of transistor $Q_5$. As long as the voltage $V_F$ exceeds the voltage $V_0$ developed by the timing circuit, transistor $Q_5$ remains reverse biased and is retained in the cut-off state.

When the voltage $V_0$ exceeds voltage $V_F$, base current will flow into transistor $Q_5$ producing collector current flow downwardly through resistor $R_8$. The common terminal 23 between resistor $R_8$ and the collector electrode of transistor $Q_5$ is connected to the anode gate of silicon controlled switch $SCS_1$. When the voltage rise across resistor $R_8$ exceeds the anode gate firing potential of silicon controlled switch $SCS_1$, the gate current starts to flow and $SCS_1$ switches to the conducting state. This current flow develops a voltage drop across resistor $R_{10}$ which actually represents the application of the charge on capacitor $C_2$ to be applied to the gate of silicon controlled rectifier $SCR_1$ causing it to switch into the conductive state, establishing a current path in bus 12 through trip coil TC and silicon control rectifier $SCR_1$ to bus 13. Current flow through trip coil TC is then employed to operate a circuit interrupter (not shown) to perform a tripping operation.

Whereas the short-time pick-up circuit of the figure has been described as being capable of removing at least one of the components of the timing circuit, it should be understood that the circuit may be altered to remove more than one element to alter the current-time characteristic curve and further may be modified to enable the operation of one or more components of the timing circuit when a predetermined voltage level is achieved, all of these modifications being well within the purview of one with ordinary skill in the art.

It can, therefore, be seen that the instant invention provides a novel static overcurrent relay means having a novel short-time pick-up circuit capable of automatically and instantaneously altering the time-current characteristic curve of the relay means timing circuit when a predetermined voltage level is achieved to provide improved monitoring of a power transmission circuit being protected.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. For use in protecting current distribution networks static overcurrent relay means responsive to overcurrent conditions for operating circuit protective devices after a predetermined time period and before the network is damaged comprising first means for generating a D.C. voltage representative of the current being monitored in said network; second means coupled to said first means for generating a predetermined voltage level after a predetermined time delay; third means coupled to said first means and normally inhibiting the operation of said second means until the output voltage level of said first means achieves a predetermined magnitude; fourth means coupled to said first means for altering the predetermined time delay period of said second means when said first means achieves a predetermined voltage level; fifth means coupled to said second means for energizing a circuit protective device when the output voltage of said second means achieves a third predetermined magnitude.

2. The device of claim 1 wherein said first means is comprised of current transformer means; and full wave rectification means connected across the output of said current transformer means for generating said D.C. voltage.

3. The device of claim 1 wherein said second means is comprised of a passive network of resistive and reactive elements for generating the desired time delay.

4. The device of claim 2 wherein said second means is comprised of a passive network of resistive and reactive elements for generating the desired time delay.

5. The device of claim 1 wherein said second means is comprised of a passive network of resistive and reactive elements for generating the desired time delay substantially in accordance with the equation $$\frac{V_0}{V_1}\left(\frac{t}{T}\right)^{1/2}$$

where:
$V_0$ is the output voltage of said timing circuit
$V_1$ is the input voltage to said timing circuit
$t$ is elapsed time, and $$T=\frac{T_1}{V_0}$$

where $T_1$=time constant of the timing circuit.

6. The device of claim 5 further comprising sixth means coupled to said first means for providing a reference voltage level; said fourth means comprising means for disabling at least one of said reactive elements when said second predetermined voltage level is greater than said reference voltage level.

7. The device of claim 6 wherein said fourth means is comprised of transistor means having one electrode coupled to receive said reference voltage level and a second electrode coupled to receive said first means output.

8. The device of claim 6 wherein said fourth means is comprised of transistor means having one electrode coupled to receive said reference voltage level and a second electrode coupled to receive said first means output; second transistor means electrically coupled to at least one of said reactive components and being controlled by said first transistor means to disable the said associate reactive component when said second predetermined voltage level is achieved.

9. The device of claim 6 further comprising seventh means coupled to said second means comprised of a transistor having one electrode coupled to a variable resistance permitting the output voltage $V_0$ of said timing circuit to be varied.

10. The device of claim 9 wherein said fifth means is comprised of first semi-conductor means; eighth means coupled to said seventh means comprised of second semi-conductor means for firing same; said second semi-conductor means being controlled by the output of said second means to fire said semi-conductor means and being powered by said sixth means.

11. The device of claim 10 wherein said sixth means is comprised of zener diode; a capacitor being coupled across said zener diode for accumulating energy to fire said second semi-conductor means.

12. The device of claim 10 wherein said first and second semi-conductor means are silicon controlled rectifiers.

References Cited

UNITED STATES PATENTS

| | | | |
|---|---|---|---|
| 3,105,920 | 10/1963 | Dewey | 317—36 |
| 3,167,686 | 1/1965 | Riebs | 317—36 X |
| 3,201,651 | 8/1965 | Calhoun | 317—36 |

MILTON O. HIRSHFIELD, *Primary Examiner.*

J. D. TRAMMELL, *Assistant Examiner.*